United States Patent Office 3,452,002
Patented June 24, 1969

---

3,452,002
ADDUCTS OF ALKYLENE IMINES AND CARBOXYLIC ACIDS
Jay Brasch, Elizabeth, N.J., assignor to Esso Research and Engineering Company, a corporation of Delaware
No Drawing. Filed Dec. 22, 1966, Ser. No. 603,790
Int. Cl. C07d *41/00, 41/06;* C10m
U.S. Cl. 260—239.3                                    10 Claims

ABSTRACT OF THE DISCLOSURE

An oil-soluble ashless dispersant for an oil composition such as a mineral lubricating oil is prepared by reaction of one mole of an aliphatic monocarboxylic acid, dicarboxylic acid or carboxylic acid anhydride of from 600 to 5000 molecular weight with from 1 to 30 moles of a monomeric alkylene imine of from 2 to 20 carbon atoms, e.g., by reacting polyisobutenyl succinic anhydride of 900 to 1000 molecular weight with propylene imine monomer. The reaction can take place at ambient temperatures or at temperatures from about −30° F. up to the boiling point of the imine. The chemical nature of the reaction varies with the proportion of imine to acid or acid anhydride and is also influenced by the presence or absence of an acid catalyst e.g. HCl or $BF_3$.

---

This invention concerns an improved process for introducing a polyamino group into a high molecular weight carboxylic acid. More particularly, it concerns an adduct of high molecular weight monocarboxylic or dicarboxylic acid obtained by reaction of the said acid with an alkylene imine, particularly ethylene imine or propylene imine, as well as the preparation of such an adduct, and its use in oil compositions. The reaction product is a highly effective, oil-soluble, ashless dispersant for oil compositions and particularly for mineral lubricating oils.

It is known in the prior art to prepare amide and imide derivatives of monocarboxylic and dicarboxylic acids for use as rust inhibitors, pour point depressants, sludge dispersants, and the like. These products are prepared by reacting the organic carboxylic acids with alkylene polyamines such as ethylene diamine, triethylene tetramine, tetraethylene pentamine, and the like. The products obtained by reaction of relatively low molecular weight carboxylic acids with polyamines are principally useful as rust inhibitors as taught, for example, in U.S. Patent 2,604,451. The carboxylic acid in this case is usually an alkenyl succinic acid or related carboxylic acid having from about 8 to 20 carbon atoms. Amides of polyamines and carboxylic acids of about 10 to 20 carbon atoms such as stearic acid and alkylene polyamines have also been used as pour point depressants, as taught, for example, in U.S. Patent 2,291,396. More recently, the amide and imide derivatives of alkylene polyamines and higher molecular weight monocarboxylic or dicarboxylic acids having from about 40 to 200 carbon atoms have been employed as highly effective dispersants for lubricating oil compositions and similar applications.

In the prior art methods of preparing the amides and imides referred to above, the acid or its anhydride is reacted with the alkylene polyamine in the presence of added heat at a temperature of about 200 to 400° F. so as to drive off water that is split out in the reaction. It has now been found that a reaction product of the nature of an amide or imide derivative of an organic carboxylic acid and an alkylene polyamine can be prepared more simply and with better control of the reaction by reacting the organic acid or anhydride with an alkylene imine, or more particularly with ethylene imine or propylene imine, although higher alkylene imines of up to about 24 carbon atoms can be used. The reaction can be conducted at ambient temperatures without requiring the use of heat. By proper control of the reaction, homopolymerization of the alkylene imine can be regulated to give a polyamine chain of any desired length attached to the organic acid molecule.

In accordance with the present invention, an organic monocarboxylic acid, dicarboxylic acid or dicarboxylic acid anhydride of a desired molecular weight, e.g., from about 600 to 5000 molecular weight, is reacted with an alkylene imine, preferably in the presence of a hydrocarbon diluent and more preferably in the presence of a lubricating oil at a temperature in the range of from about −30° F. up to a temperature not exceeding the boiling point of the imine. Normally the reaction proceeds without the addition of external heat, although in some cases heating or cooling may be required for proper control.

Depending upon the presence or absence of a catalyst and depending on the proportion of imine to acid or anhydride, the reaction can take one or more of several forms, including the following:

(A) Equimolar proportions of anhydride and imine

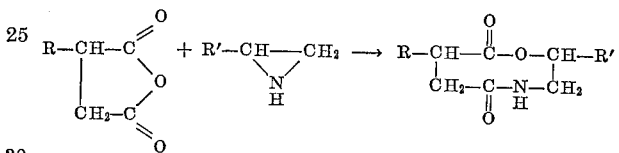

(B) Two moles of anhydride and X+1 moles of imine

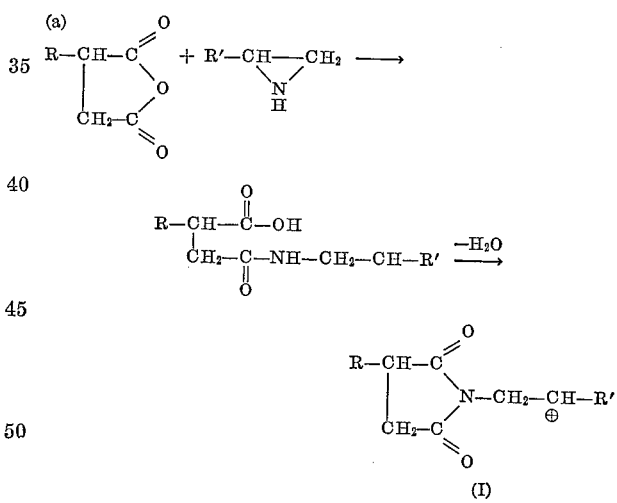

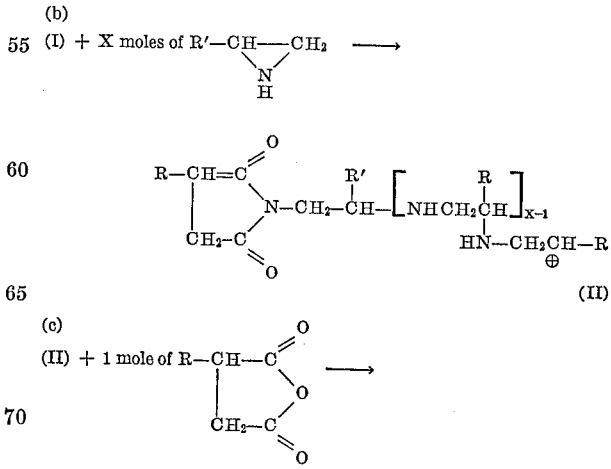

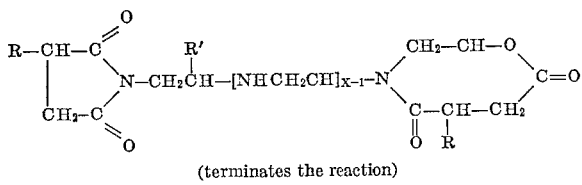

(terminates the reaction)

(C) Two moles of carboxylic acid plus X+1 mole of imine (a)

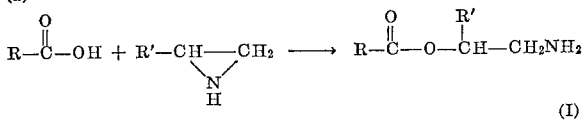

(b)

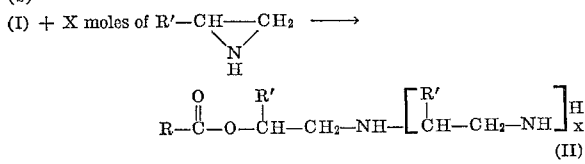

(c)

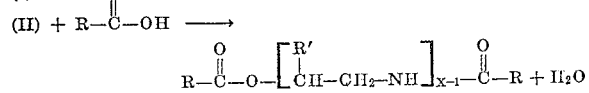

The above reaction mechanisms are merely representative and are not limiting. R and R' are, respectively, alkyl groups of the carboxylic acid and of the imine. R' will be hydrogen in the case of ethylene imine. Reactions of the type of A and C do not require a catalyst, but are very slow relative to reaction B. Reaction B does not normally require an acid catalyst, e.g., an oil-soluble catalyst, such as $BF_3$, boron trifluoride ethereate

etc., or an aqueous acid catalyst, e.g., aqueous mineral acid, e.g., sulfuric, phosphoric, or hydrochloric, preferably the latter. Care must be taken when using acid catalysts to prevent explosive polymerization of the imine. Thus, aqueous mineral acids should be used in dilutions below 0.3 N. If boron trifluoride etherate is used, it is advisable to employ less than 0.4 gram per 50 ml. of reaction mixture.

Monocarboxylic acids for use in the present invention will have molecular weights in the range of about 600 to 4000, preferably about 700 to 3000. Such acids can be prepared by oxidizing high molecular weight olefins such as polyisobutylene of about 900 molecular weight with an oxidizing agent such as nitric acid or oxygen, by preparing an adduct of an aldehyde and olefin and then oxidizing the adduct, or by halogenating a high molecular weight olefin to form a dihalogen compound and then subjecting the latter to hydrolyzing oxidation. These procedures are taught in British Patent 983,040.

A suitable monocarboxylic acid or derivative thereof can also be obtained by oxidizing a monohydric alcohol with potassium permanganate or by reacting a hologenated high molecular olefin polymer with a ketene. Another convenient method for preparing a monocarboxylic acid involves the reaction of metallic sodium with an acetoacetic ester or malonic ester of an alkanol to form a sodium derivative of the ester and the subsequent reaction of the sodium derivative with a halogenated high molecular weight hydrocarbon such as brominated wax or brominated polysiobutylene.

Monocarboxylic acids can also be prepared from olefin polymers such as a polymer of a $C_2$ to $C_5$ monoolefin, e.g., polypropylene or polyisobutylene by halogenating the polyolefin and then condensing it with an unsaturated monocarboxylic acid. Examples of suitable olefin polymers include polyethylene, polypropylene, or polyisobutylene, having an average molecular weight of about 600 to 3000, preferably about 800 to 1900. Such polymers have from about 40 to 250 carbon atoms or more preferably about 50 to 120 carbon atoms per molecule. Polyisobutylene is preferred, since it has a lessened tendency to gel the product, as compared to some of the other polyolefins such as polyethylene or polypropylene. The polymer is halogenated by contacting it with either bromine or chlorine, preferably by blowing chloride through the polymer, to provide about one to two atoms of halogen per molecule of polymer. The halogenation step may be conducted in the temperature range of from about 50 to about 30° F. To aid in the halogenation step, the polymer may be dissolved in a suitable solvent, such as carbon tetrachloride, in order to lower the viscosity of the polymer. However, the use of such a solvent is not necessary.

The time required for halogenation may be varied to some extent by the rate at which the halogen is introduced. Ordinarily from about 2 to about 5 hours is a satisfactory halogenation period. In a representative plant scale operation involving the chlorination of polyisobutylene of 830 molecular weight, a 100-pound batch will be chlorinated with 10 pounds of chlorine introduced into the reactor over a period of 3½ hours with a chlorination temperature of about 250° F.

The halogenated polymer thus obtained is condensed with an alpha, beta-unsaturated, monocarboxylic acid of from about 3 to 8 carbon atoms. Ordinarily, because of their greater availability, acids of this class having 3 or 4 carbon atoms will be used. Such acids include acrylic acid, alpha-methyl-acrylic acid (i.e., 2-methyl propenoic acid) and crotonic or isocrotonic acid (beta-methylacrylic acid). Other alpha, beta-unsaturated acids that may be employed include tiglic acid (alpha-methylcrotonic acid), angelic acid (alpha-methylisocrotonic acid), sorbic acid, and cinnamic acid. Esters of such acids, e.g., ethyl methacrylate, may be employed if desired in place of the free acid.

In condensing the halogenated polyolefin with the unsaturated acid, at least one mol of acid is used per mol of halogenated polyolefin. Normally, the acid will be employed in excess and may amount to as much as 1.5 to 2 mols per mol of halogenated polyolefin. The condensation temperature may be in the range of from about 300° to 500° F. and will more preferably be within the range of from about 375° to 475° F. The condensation may require from about 3 to about 24 hours, but will ordinarily take place in from 6 to 18 hours. After the reaction has been completed, excess acid can be purged from the mixture, for example, by blowing with a stream of nitrogen at a temperature of 400° to 500° F.

High molecular weight carboxylic olefin acids of the invention may also be prepared by a so-called one-step process involving the halogenation of the olefin polymer in the presence of the alpha, beta-unsaturated acid. Using proportions of reactants within the ranges discussed above, the starting acid and the olefin polymer are mixed together in the reactor, the temperature being kept below about 150° F. until the start of halogen introduction so as to avoid homopolymerization of the alpha, beta-unsaturated acid. Once halogenation has begun, the temperature can be raised to as high as 250° F. After halogen introduction, the temperature can be raised to 300 to 500° F. to effect the condensation reaction.

A polycarboxylic acid for use in the invention can be prepared by halogenating a high molecular weight hydrocarbon such as the olefin polymer described hereinabove to produce a polyhalogenated product, converting the polyhalogenated product to a polynitrile, and then hydrolyzing the polynitrile. Polycarboxylic acids can be prepared also by oxidation of a high molecular weight polyhydric alcohol with potassium permanganate, nitric acid, or a like oxidizing agent. Another method for preparing such polycarboxylic acids involves the reaction of an olefin or a polar-substituted hydrocarbon such as a chloropolyisobutylene with an unsaturated polycarboxylic acid such as 2-pentene-1,3,5-tricarboxylic acid obtained by dehydration of citric acid.

A particularly useful polycarboxylic acid is a saturated aliphatic hydrocarbon substituted succinic acid or anhydride.

The alkenyl succinic acid anhydrides may be represented by the formula:

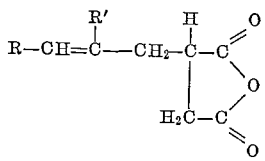

R and R' are either hydrocarbon radicals or hydrogen, but at least one of them must be hydrocarbon.

The preparation of an alkenyl succinic anhydride is well known in the art and simply involves reacting maleic anhydride with an organic compound having an olefinic linkage. Generally, about equal molar proportions of maleic anhydride and the olefinic material are merely heated together.

The hydrocarbon radicals in the alkenyl succinic anhydrides can be either straight-chain or branched chain and they may be either substituted, as for example, chlorinated or sulfurized, or they may be unsubstituted, and they will include aliphatic, acyclic and aromatic radicals. Preferably, the total number of carbon atoms in the hydrocarbon groups is within the range of from about 40 to 250, more preferably within the range of from about 50 to about 120. Particularly desirable for use, because of low cost and ready availability, are alkenyl groups obtained by reacting maleic anhydride with a polymer of a $C_2$ to $C_5$ monoolefin wherein the polymer has a molecular weight within the range of from about 300 to about 3000 or more. Especially useful products are obtained when the molecular weight range is from about 500 to about 1900 or more especially from about 700 to about 1700. As specific examples, the alkenyl group may be derived from polypropylene or polyisobutylene, e.g., polyisobutylene of 780 molecular weight or of 1200 molecular weight.

The alkylene imines employed in this invention are characterized by the formula:

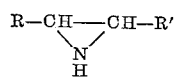

wherein R and R' are hydrogen or alkyl groups, the total of R plus R' not exceeding about 20. Preferably, the total carbon atoms in R plus R' does not exceed about 12, and most preferably is no greater than about 6. Thus, the preferred alkylene imines include ethylene imine, propylene imine, 1,2-butylene imine, C-propyl ethylene imine, 2,3-butylene imine, C-amyl ethylene imine, 1,1-diethyl ethylene imine, 2,3-hexylene imine and C-butyl ethylene imine.

Higher alkylene imines include C-dodecyl ethylene imine, 2,3-decylene imine, C-cetyl ethylene imine, C-octadecyl ethylene imine, and C-decyl, C'-dodecyl ethylene imine.

Ethylene imine and propylene imine are particularly preferred. These imines are colorless, mobile liquids having an amine-like odor. Ethylene imine has a molecular weight of 43, a boiling point of 56 to 57° C., and a density at 25° C. of 0.832. Propylene imine has a molecular weight of 57, a boiling point of 57° C., and a density at 25° C. of 0.79. In an aqueous medium and in the presence of an acid catalyst, ethylene imine and propylene imine will undergo polymerization to a homopolymer. For this reason, polymerization is normally inhibited by storing the imine in contact with a strongly basic material such as pellets of caustic soda. The small amount of caustic that tends to dissolve in the imine does not interfere with the desired reactions.

As stated above, it is preferred in conducting the process of the present invention to react the organic acid with the alkylene imine in the presence of a hydrocarbon diluent. This diluent can be a light or heavy naphtha, or an aromatic hydrocarbon such as benzene or toluene, for example, or it can be a mineral lubricating oil such as one having a viscosity of from 80 to 250 SUS at 100° F. Use of the mineral lubricating oil diluent is preferred when the product is to be added to a lubricating oil composition.

In conducting the process of this invention, the reactants can be employed in ratios ranging from 1 to 30 mols of alkylene imine per mol of organic carboxylic anhydride or acid. The organic carboxylic acid or anhydride will have a molecular weight within the range of from about 600 to 5000, or more preferably within the range of from about 700 to 3000. It is preferred to conduct the reaction in the presence of from 120 to 200 wt. percent of diluent based on the total reactants (other than diluent). The reaction can be conducted at a temperature as low as −30° F. and reaction temperatures can range up to the boiling point of the imine. Preferred temperatures range from about 15° to 80° F. Reaction times range from about 0.25 to 4 hours, and preferably from about 1 to 2 hours.

The order in which the reactants are added to the reaction vessel is important when a catalyst is used. The carboxylic acid or acid anhydride and the diluent are first mixed together and the inhibited alkylene imine is then added. The mixture is stirred for a sufficent period of time to insure thorough mixing. This is important in order to be certain that ion pairs will be formed so as to bring about the desired reaction between imine and acid or anhydride. Otherwise, the imine would react solely with itself in the subsequent step and thereby produce only a mixture of polymerized imine and carboxylic acid and anhydride.

After the mixture has been stirred for a considerable time to insure thorough mixing as discussed above, the acid catalyst is added to initiate the imine polymerization step. Normally the polymerization portion of the reaction will take place in about 10 to 20 minutes. If an oil-soluble acid catalyst such as boron trifluoride etherate is used, the reaction will be completed in less than 15 minutes. If an aqueous acid catalyst is used, e.g., aqueous HCl, the rate of reaction will be dependent somewhat upon the efficiency of mixing of the catalyst and the reactants, i.e., the more efficiently a catalyst emulsion is formed, the faster the reaction. It is thus seen that the major portion of the total reacting time is consumed in the intimate mixing step required to bring about the reaction of imine with carboxylic acid or anhydride before the acid catalyst is added.

The extent of polymerization attained in the polymerization step depends somewhat on the temperature. In general, lower temperatures will favor more polymerization and thereby incorporate a greater proportion of the nitrogenous polar function into the product.

To complete the reaction the water of reaction and any unreacted imine are removed by heating the reaction mixture under a reduced pressure. This stripping may be aided by adding heptane to the mixture in sufficient quantity to azeotrope the water. The stripping process will also serve to remove the acid catalyst.

The dispersant additives of this invention can be employed in concentrations ranging from about 0.001 to about 10 wt. percent in oil compositions ranging from gasoline fractions through middle distillate fuels and lubricating oils. In lubricating oil compositions, the additive will generally be used in concentration ranges of about 0.01 to 10 wt. percent, preferably 0.1 to 5 wt. percent. These lubricating oils include not only mineral lubricating oils but also synthetic oils, e.g., dibasic acid esters such as di-2-ethyl hexyl sebacate, carbonate esters, phosphate esters, halogenated hydrocarbons, polysilicones, polyglycols, etc.

The additives of this invention can also be employed in middle distillate fuels for inhibiting corrosion and the formation of sludge and sediment in such fuels. Here, concentration ranges of about 0.001 to about 2 wt. percent, or more generally from about 0.005 to 0.2 wt. percent, are employed. Petroleum distillate fuels boiling in the range of from about 300° to about 900° F. are contemplated. Typical of such fuels are No. 1 and No. 2 fuel oils that meet ASTM specification D–396–48T, diesel fuels qualifying as Grades 1D, 2D and 4D of ASTM specification D–97551–T, and various jet engine fuels. Because they are ashless, these additives are particularly desirable for such fuels in that they do not give rise to glowing ashes nor deter from the burning qualities of the distillates.

The additives of this invention can also be employed, either alone or in combination with other hydrocarbon-soluble additives, in jet fuels and gasolines in concentrations ranging from about 0.001 to 1.0 wt. percent as detergent and/or rust preventive additives.

In any of the aforesaid fuel or lubricant compositions, other conventional additives may also be present, including dyes; pour point depressants, e.g. wax-alkylated naphthalene; antiwear agents, e.g., tricresyl phosphate, zinc dialkyl dithiophosphates with alkyl groups of 3 to 8 carbon atoms; antioxidants such as phenyl-alpha-naphthylamine, tert. octylphenol sulfide, bis-phenols such as 4,4'-methylene bis (2,6-di tert. butylphenol); viscosity index improvers such as polymethacrylates, polyisobutylene, and the like, as well as other dispersants, e.g., alkaline earth metal hydrocarbon sulfonates, metal salts of alkyl phenols, etc.

The dispersant additives of the invention may be used to enhance the dispersancy-detergency of lubricants containing conventional detergents, wherein the latter are used in concentrations in the range of about 0.5 to 5 wt. percent. When the conventional detergents or dispersants are metal-containing materials it is possible, by utilizing the additives of the present invention in combination therewith, to obtain added dispersancy or detergency without materially increasing the total ash-forming properties of the composition. Such metal-containing detergents or combination detergent-inhibitors include the alkaline earth metal salts of alkylated phenols or of alkylated phenol sulfides, as for example barium-calcium nonyl sulfide or the barium salt of phenol alkylated with tripropylene. Other such detergent inhibitors include dispersions of barium carbonate or calcium carbonate in mineral oil containing various surfactants such as phosphosulfurized polyolefins, for example.

Other examples of metal-containing detergents include the oil-soluble alkaline earth metal salts of high molecular weight sulfonic acids obtained by sulfonating either natural or synthetic hydrocarbons. Specific examples of suitable sulfonates include calcium petroleum sulfonate, barium petroleum sulfonate, calcium di-$C_9$ alkyl benzene sulfonate ($C_9$ group from tetraisobutylene). The sulfonates may be of either the neutral type or of the "overbased" or "high alkalinity" type, containing metal base in excess of that required for simple neutralization, wherein the excess metal base has been neutralized with carbon dioxide.

The dispersants of this invention can also be used in conjunction with other ashless detergents or dispersants such as high molecular weight polymeric dispersants made with one or more polar monomers, such as vinyl acetate, vinyl pyrrolidone, methacrylates, fumarates and maleates. These dispersants have molecular weight in the range of about 500 to 50,000, and some of them have pour point depressing and viscosity-index-improving properties as well. One example is a copolymer of 65 to 85 wt. percent of mixed $C_9$ to $C_{12}$ fumarates, 10 to 20 wt. percent of vinyl acetate, and 5 to 15 wt. percent of N-vinyl pyrolidone. Another example is the copolymer derived by reaction of mixed tallow fumarates and $C_8$ oxo fumarates, averaging about 420 molecular weight, with vinyl acetate in a 3 to 1 acetate-fumarate ratio, and 3 wt. percent of maleic anhydride, followed by subsequent removal of excess vinyl acetate. By tallow fumarates is meant the esters of fumaric acid and the alcohols derived by hydrogenation of tallow. The latter are principally $C_{16}$ and $C_{18}$ alcohols with minor amounts of $C_{12}$, $C_{14}$ and $C_{20}$ alcohols. $C_8$ oxo alcohols are prepared by reaction of carbon monoxide and hydrogen on mixed $C_3$ to $C_4$ olefins followed by hydrogenation of the resulting aldehydes.

It is within the contemplation of this invention to prepare additive concentrates in which the concentration of additive is greater than would normally be employed in a finished lubricant. These concentrates will contain in the range of from 10 to 80% of additive, or more usually from about 30 to 60 wt. percent of additive, on an active ingredient basis, the balance being mineral oil. Such concentrates are convenient for handling the additive in the ultimate blending operation into a finished lubricating oil composition. The additive concentrates can consist simply of an additive of the present invention in a suitable mineral oil medium or they can include other additives that are intended for use along with the additives of the invention in a finished lubricant.

While the lubricant compositions herein described are primarily designed as automotive crankcase lubricants, the additives of the invention may also be employed in other hydrocarbon oil compositions, including turbine oils, various industrial oils, gear oils, hydraulic fluids, transmission fluids and the like.

The nature of this invention will be better understood from the following examples, which include a preferred embodiment.

EXAMPLE 1

For this preparation a polyisobutenyl succinic anhydride was employed which had been obtained by reaction of polyisobutylene of 900 molecular weight with succinic anhydride. A mixture of 21 grams of the polyisobutenyl succinic anhydride (0.02 mole), 25 grams of a solvent neutral mineral lubricating oil (150 SUS at 150° F.), and 7.5 ml. (0.1 mole) of propylene imine monomer was stirred for 1 hour at room temperature (72° F.). A change in the color of the mixture to a dark brown indicated that reaction was taking place. At the end of the one-hour period, a solution of 0.4 gram of concentrated HCl in 20 ml. of water was added. Stirring of the mixture caused the formation of an emulsion having a light tan color. After 10 to 15 minutes of stirring, the emulsion was taken up in 250 ml. of heptane and the mixture was allowed to settle, causing the separation of a water layer. The heptane layer was separated from the water layer and was then heated on a steam bath under vacuum (15 mm. pressure) which effected the removal of the heptane, water, and any excess imine. Analysis of the product showed 83.44 wt. percent carbon, 13.61% hydrogen, 1.62% nitrogen. The product was a 50 wt. percent concentrate of additive in lubricating oil. Infrared analysis indicated the presence of NH and CO—NH bands but no acid anhydride bands.

EXAMPLE 2

Following the general procedure of Example 1 and employing aqueous HCl catalyst, a 60 wt. percent concentrate of additive in mineral lubricating oil is prepared by the reaction of 53 grams (0.06 mole) of polyisobutenyl propionic acid with 13.2 ml. (0.25 mole) of ethylene imine in 45 grams of light mineral lubricating oil diluent. Reaction temperature is 65° F.

The polyisobutenyl propionic acid is prepared by chlorinating polyisobutylene of 780 molecular weight to 4.3 wt. percent chlorine content, reacting about 11 parts by weight of the chlorinated product with 1 part by weight of acrylic acid at 425° F. for about 6 hours at 20 p.s.i.g., followed by nitrogen purging to remove unreacted acyclic acid. The reaction product has a total neutralization number of about 46.2 mg. KOH per gram (ASTM D-664).

EXAMPLE 3

The procedure of Example 1 is repeated, except that in place of the HCl catalyst, 0.2 gram of $BF_3$ ethyl etherate is used as the catalyst.

EXAMPLE 4

The additive concentrate obtained as described in Example 1 was mixed with a used lubricating oil (described below) in 2 wt. percent concentration, thus effecting the addition of 1 wt. percent of actual additive. Another blend was prepared by adding to another portion of the same used oil 1 wt. percent of a commercial dispersant prepared by condensing polyisobutenyl succinic anhydride derived from 800 molecular weight polyisobutylene with tetraethylene pentamine at about 300° F. to form the imide. The additive was obtained in the form of a 60 wt. percent concentrate; sufficient of the concentrate was used to furnish 1 wt. percent of actual additive.

The two blends prepared as described were subjected to a sludge dispersancy bench test which had been found, after a larger number of evaluations, to be an excellent screening test for lubricating oil dispersant additives. The effectiveness of this bench test is indicated by the fact that all dispersant additives that failed the test also failed in subsequent full-scale engine tests that were designed to evaluate the sludge dispersing ability of dispersant additives and by the fact that all additives that were found to be effective in such engine tests also passed the bench test.

The sludge dispersancy bench test was conducted in the following manner. The medium chosen for the sludge test was a used oil (original viscosity about 325 SSU at 100° F.) that had been run in a fleet of taxicabs in New York City. This used oil contained a fine dispersion of actual engine sludge. About 10 ml. of each of the blends described above, i.e., blends of the test additives in the used oil described, was placed in a centrifuge tube and then centrifuged in a conventional centrifuge for one hour. It was observed that after this period of time a sludge-free region with a closely defined boundary formed at the top of the centrifuge tube. The relative length of this sludge-free region with respect to the total length of the sample in the centrifuge tube was determined. From long experience with the test, it was found that if the clear region did not exceed 10% of the total length of sample, the dispersant was an accepable additive.

The results obtained with the two blends described are shown in Table II, which follows:

Table II.—Sludge dispersancy bench test

| Additive | Percent clear oil |
|---|---|
| Product of Example 1 | 7 |
| Commercial dispersant | 10 |

It is seen from the data that the product of Example 1 was equally as effective as the imide dispersant of the prior art as a dispersing agent for sludge in a crankcase lubricant.

EXAMPLE 5

About 0.007 wt. percent of the concentrate of Example 2 is added to a leaded gasoline to impart carburetor detergency action thereto. The gasoline contains 3 cc. of lead tetraethyl per gallon and has an initial boiling point of 85° F., a 50% point of 205° F. and a final boiling point of 380° F.

EXAMPLE 6

A compounded lubricant suitable for use as a crankcase oil is prepared by blending into a light mineral lubricating oil base stock sufficient viscosity index improver (15,000 molecular weight polyisobutylene) to place it in the SAE 10W-30 viscosity class along with 0.8 wt. percent of a high alkalinity calcium synthetic alkyl aromatic sulfonate of 11.4 wt. percent calcium content and 300 total base number, 0.5 wt. percent of a pour point depressant (waxalkylated naphthalene), and 1.8 wt. percent of the product of Example 1.

EXAMPLE 7

To a heating oil comprising a mineral oil distillate having a boiling range of about 350° F. to 680° F. and derived from mixed cracked and straight run distillates is added 0.04 wt. percent of the product of Example 2 to serve as an inhibitor of sludge.

In summary, the present invention concerns the preparation of an oil-soluble dispersant additive by reacting a high molecular weight monocarboxylic acid or dicarboxylic acid or carboxylic acid anhydride with a monomeric alkylene imine. After the acid or anhydride and the imine have been in contact for a sufficient period of time to bring about the reaction between them, the imine portion can be subjected to polymerization in the presence of an acid catalyst, whereby a product is obtained that contains a plurality of imine units. It is thus possible to prepare dispersant additives that are similar in nature and utility to those disclosed in U.S. Patents 3,172,892 and 3,219,666, i.e., an amide or imide of a high molecular weight carboxylic acid and an alkylene polyamine. However, the reaction products of the present invention do differ in their chemical nature from the reaction products of alkylene polyamines and high molecular weight carboxylic acids or anhydrides, as is shown by the reaction mechanisms set forth earlier in the specification.

In addition to the difference in the chemical nature of the products of the present invention as compared to those of the prior art, the present invention process has a number of advantages over the preparation of dispersant additives by the prior art process of forming an amide or imide as taught in the aforesaid U.S. Patents 3,172,892 and 3,219,666. Among these advantages are that the reaction is much simpler and faster, the reaction requires no external heating, and the nature of the product can be predetermined by choosing reaction time and temperature so as to control the degree of polymerization. In the commercial preparation of the prior art products, the polyamines that are used are ordinarily impure, and contain unknown components which frequently lead to hazy products because of unreacted materials that are present. This disadvantage is avoided in the present invention because here the stoichiometry is completely known, and essentially all the nitrogen that is added to the reaction ends up in the dispersant molecule.

It is to be understood that the examples presented herein are intended to be merely illustrative of the invention and not as limiting it in any manner; nor is the invention to be limited by any theory regarding its operability. The scope of the invention is to be determined by the appended claims.

What is claimed is:

1. A process for preparing an oil-soluble dispersant additive which comprises reacting 1 mole of an aliphatic carboxylic acid, selected from the class consisting of monocarboxylic acids, dicarboxylic acids and carboxylic acid anhydrides, of from 600 to 5000 molecular weight, with from 1 to 30 moles of a monomeric alkylene imine having a total of from 2 to 12 carbon atoms, at a temperature in the range of from about 15° F. to about 80° F., said reaction being effected during a period of from about 0.25 to 4 hours by first thoroughly mixing said aliphatic carboxylic acid with said monomeric alkylene imine in the absence of water, then adding to said mixture an acid catalyst selected from the group consisting of an aqueous mineral acid, boron trifluoride, and boron trifluoride etherate, and thereafter removing acid catalyst, water of reaction, and any unreacted imine from the reaction mixture.

2. Process as defined by claim 1 wherein the total number of carbon atoms in said alkylene imines is from about 2 to 6.

3. Process as defined by claim 1 wherein said alkylene imine comprises propylene imine.

4. Process as defined by claim 1 wherein said alkylene imine comprises ethylene imine.

5. Process as defined by claim 1 wherein said carboxylic acid comprises an alkenyl succinic anhydride.

6. Process as defined by claim 5 wherein in said alkenyl succinic anhydride the alkenyl group is derived from polyisobutylene having a molecular weight in the range of from about 800 to about 1900.

7. Process as defined by claim 1 wherein said carboxylic acid is a monocarboxylic acid derived by halogenating a $C_2$ to $C_5$ monoolefin polymer of from 700 to 3000 molecular weight and condensing the halogenated polymer with an alpha, beta-unsaturated aliphatic monocarboxylic acid of from 3 to 8 carbon atoms.

8. Process as defined by claim 1 wherein said carboxylic acid comprises polyisobutenyl propionic acid prepared by chlorinating polyisobutylene of about 800 to 1900 molecular weight and condensing the chlorinated polyisobutylene with acrylic acid.

9. Process as defined by claim 1 wherein said reaction temperature is in the range of from about 15° to 80° F.

10. Process as defined by claim 1 wherein said reaction is conducted in the presence of a hydrocarbon diluent.

References Cited

UNITED STATES PATENTS 2,182,306   12/1939   Ulrich et al.
3,272,746   9/1966   Le Suer et al.

PATRICK P. GARVIN, *Primary Examiner.*

U.S. Cl. X.R.

44—63, 71; 252—51.5; 260—404, 404.5, 326.3, 326.5